United States Patent [19]

Carbonaro et al.

[11] Patent Number: 4,710,553
[45] Date of Patent: Dec. 1, 1987

[54] PROCESS FOR THE POLYMERIZATION OR COPOLYMERIZATION OF BUTADIENE

[75] Inventors: Antonio Carbonaro, Milan; Silvano Gordini; Salvatore Cucinella, both of San Donato Milanese, all of Italy

[73] Assignee: Enichem Elastomeri S.p.A., Palermo, Italy

[21] Appl. No.: 859,009

[22] Filed: May 2, 1986

[30] Foreign Application Priority Data

May 15, 1985 [IT] Italy ................................ 20715 A/85

[51] Int. Cl.$^4$ ............................................. C08F 4/52
[52] U.S. Cl. ..................................... 526/142; 526/73; 526/143
[58] Field of Search ........................... 526/142, 143, 73

[56] References Cited

U.S. PATENT DOCUMENTS 4,242,232 12/1980 Sylvester ........................... 526/137
4,525,549 6/1985 Carbonaro ........................ 526/142
4,575,538 3/1986 Hsieh ................................ 526/142

Primary Examiner—Paul R. Michl
Attorney, Agent, or Firm—Hedman, Gibson, Costigan & Hoare

[57] ABSTRACT

This invention concerns the production of 1,4-cis polybutadiene or copolymers of butadiene with other related diolefins through the catalytic polymerization or copolymerization of butadiene monomer by a continuous or discontinuous process carried out in the absence or substantial absence of solvents or diluents, operating in two successive phases (the first at a T<30° C. and the second at a T=or>30° C.) by control of the molecular weights.

23 Claims, No Drawings

PROCESS FOR THE POLYMERIZATION OR COPOLYMERIZATION OF BUTADIENE

This invention concerns the production of 1,4-cis polybutadiene through the catalytic polymerization of butadiene monomer by a continuous process carried out in the absence or substantial absence of solvents or diluents, operating in two successive phases (the first at a $T<30°$ C. and the second at a $T=$or$>30°$ C.) in one or more polymerization reactors in which the heat of reaction is dissipated by evaporation of the monomer.

Various catalytic processes for the polymerization of butadiene, apt to produce polybutadiene with a high 1,4-cis content and particularly suited for the manufacture of tires and other elastomer articles, are known in the art. The catalysts generally used for the purpose derive from the combination of transition metal compounds such as titanium, cobalt, nickel, uranium and rare earth metals, with alkyls and/or hydride derivatives of metals of groups IA, IIA and IIIA of the periodic system, such as for example described in the U.S. Pat. Nos. 3,118,864, 3,178,402, 3,794,604 and 4,242,232 and in the Belgian Pat. Nos. 559,676, 573,680 and 791,709.

According to processes known in the art, the polymerization of butadiene is most often carried out in hydrocarbide solution for the purpose of controlling the temperature of polymerization and thus obtaining soluble linear polymers, free or essentially free of gel and with a controlled molecular weight.

The production of 1,4-cis polybutadiene through mass polymerization, on the other hand, has not found significant development in industrial practice, notwithstanding the evident advantages offered by a process carried out in the absence or substantial absence of solvents or diluents, in comparison with a conventional process in solution.

The reasons for this lack of success are to be found principally:

(A) in the lack of suitably defined catalytic systems which satisfy the peculiarities required for mass polymerization and more particularly:

which, in presence of an excess of monomer, do not give rise to "transfer" reactions, this being responsible for obtaining low molecular weight polymers, rarely usable in applications;

which do not cause secondary cross-linking reactions, cyclization and/or ramification in the polymer, this being responsible for the formation of substantial quantities of gel, with greatly negative effects for the characteristics required for the finished product;

which present sufficiently high activity, so that the finished polymer contains a low level of catalytic residues, in order to obviate a washing treatment;

which retain a high activity and selectivity in the high temperature conditions required to operate in a highly viscous system and with satisfactory kinetics;

(B) in the technical, rheological and heat exchange difficulties relative to the treatment of highly viscous polymer masses.

An example of a process for the mass polymerization of butadiene in order to produce 1,4-cis polybutadiene is described in the U.S. Pat. No. 3,770,710.

The U.S. Pat. No. 3,770,710 in fact concerns a process for the mass polymerization of diolefin monomers with lithium catalysts carried out in a conventional reactor, in two phases at different temperatures, and evaporating the monomer in order to control the temperature.

The operation in controlled phases derives exclusively from the need to prevent, or at least minimize, the phenomena relative to the foam and to complete the polymerization at a higher temperature. No variation in the number of phases in equilibrium occurs as a result of increased temperature.

We are furthermore aware of the U.S. patent application Ser. No. 612,800 filed on May 22, 1984 and concerning a process for the catalytic polymerization of butadiene to 1,4-cis polybutadiene, carried out in the absence or substantial absence of solvents or diluents. According to this process a catalytic mixture is prepared placing in contact, in a hydrocarbon vehicle, one or more neodymium compounds, one or more halogen contributing compounds, one or more hydroxyl containing compounds and an organometallic and/or hydride aluminum compound.

This catalytic mixture is placed in contact with the liquid butadiene monomer and the resulting mixture is fed continuously at one end of an elongated "plug-flow" type polymerization reactor, in which the polymerization of the butadiene takes place.

As an alternate, this polymerization reactor is fed continuously with a stream of the catalytic mixture and a stream of liquid butadiene.

The heat of polymerization is removed by partial evaporation of the butadiene monomer, so that by controlling the pressure in same it is possible to maintain the temperature of polymerization within the predetermined interval. By controlling also the composition of the catalyst, the butadiene/catalyst ratio, the temperature of polymerization and the time of residence in the reactor, it is possible to produce mixtures containing from approximately 25 to approximately 70% by weight of polymer, which are then discharged continuously from the other end of the polymerization reactor.

From the discharged mixture the 1,4-cis polybutadiene is recovered as a finished product, evaporating the unreacted butadiene and the eventual solvent utilized as a vehicle for the catalyst from the polymer mass containing a "short-stopper" for the catalyst and stabilizers intended to prevent thermooxidative degradation. This evaporation takes place in a solvent removing extruder.

However when operating continuously with such a process at an inlet temperature not less than 30° C., 1,4-cis polybutadiene is generally obtained whose Mooney viscosity value (ML) is not constant due to insufficient homogeneization of the system composed of catalyst, monomer and polymer.

This points out the evident inadequacy of such a product in satisfying the specifications imposed, aside from the doubtful reproducibility of results in a projected scale-up.

Now we have found that it is possible to overcome the abovementioned drawback by obtaining a 1,4-cis polybutadiene with a rigorously controlled molecular weight, thus avoiding fluctuations in the relative Mooney viscosity values.

Therefore the aim of this invention is a process which, through the combination of a suitable catalytic system and an adequate polymerization process, makes it possible to overcome the above difficulties and to obtain a high yield of linear 1,4-cis polybutadiene free of gel, with a high and rigorously controlled molecular weight, by means of polymerization carried out in absence of low boiling point hydrocarbon solvents or diluents or in presence of a minimum quantity of said low boiling point solvents or diluents (generally approximately 2% or less by weight referred to the butadiene monomer) and operating in two successive phases: the first at a temperature below 30° C. (T<30° C.) and the second at a temperature of 30° C. or higher (T=or>30° C.), preferably included between 55° C. and 90° C. (50<T<90°).

Therefore it was surprising to find that, while the mass polymerization of butadiene carried out at 30° C. and above takes place in heterogeneous phase due to the insolubility of the polymer in the monomer, the same reaction carried out at a lower temperature takes place in a single phase homogeneous system. In these conditions, with the polymer dissolved and the catalyst not segregated, the molecular weights are rigorously controlled by the physical and chemical parameters of the reaction and the resulting product is homogeneous throughout. However, since there is little need to carry out the mass polymerization to high conversions in an ever more viscous phase, due to the high energy consumption required, and it is useful to act with relatively higher kinetics, it has been found particularly advantageous to operate in two successive phases: the first at T<30 (preferably within the interval between 0° and 30° C.) and the second at T=or>30° C. (preferably between 50° and 90° C.).

The first low temperature phase, e.g. at 20° C., can be carried out to any desired conversion, but it is clearly preferable to avoid the high viscosities resulting from high conversions, as well as the limited homogeneizing effect of an early separation of the single phase in two phases.

In fact, with increased temperature, and as soon as it exceeds the threshold of 30°-35° C., there occurs a separation of the polymer, first dissolved, in a solid phase separate from the liquid phase consisting of the excess monomer. It is preferable that this takes place when 5 to 20% of the butadiene is already polymerized.

The advantage provided by the new procedure, demonstrated by the homogeneous ML values measured at various points of the reactor operating at higher temperature, is conceivably related to the fact that upon separation between swollen polymer and monomer, rather small solid particles are formed which are easily removed and transported by the agitator and agglomerate in larger forms only as the polymerization progresses. However, this agglomerate has a quite different consistency than that occurring in the absence of separation (operating at a single temperature in excess of 30° C.); it is more pasty and opportunely more compatible with the liquid phase, and is therefore more readily homogeneized by the mechanical action of the agitator.

A second valuable advantage of two-step polymerization at two different temperatures comes from the fact that, with equal proportions and equal conversion, a lower average molecular weight (ML) is obtained than in the case of reactions carried out entirely at the temperature of the second step.

This advantage is measurable in terms of Al-alkyl saved, this being the transfer agent utilized to maintain the molecular weights. The quantity saved is in relation to the ML value and in the conversion of the first step it is of significant economic extent, as the ML decrease is of at least 10 points (generally approximately 30 ML points) and the Al-alkyl represents the highest cost item among the catalystic components.

More particularly, according to this invention:
a catalytic mixture is prepared by placing in contact, in an inert hydrocarbon vessel:
(a) at least one neodymium compound chosen from among neodymium oxides, alcoholates, phenates and carboxyls, or mixtures of these with other rare earth elements;
(b) at least one organic compound containing hydroxyl groups deriving from alcohols or phenols, or carboxyl groups, with the possible addition of water;
(c) at least one halogen compound, chosen from among the secondary or tertiary alkyl, aryl or alkylaryl halogenides, halogenides of organic acids, metallic or organometallic halogenides, hydrohalogenic acids and halogens;
(d) at least one organometallic compound of aluminium or relative hydride derivatives;
the quantity of compounds (a) and (b) being such as to respect a ratio of 2/1 to 80/1 between the hydroxy and/or carboxy groups and the neodymium atoms and to hold these components in contact in order to obtain a catalytic mixture in which the aluminum/neodymium atomic ratios of 20/1 to 80/1 and the halogen/neodymium ratios of 0.2/1 to 3/1 are respected;
this catalytic mixture and the liquid butadiene monomer, possibly pre-mixed, are fed in quantities of $10^4$ to $4.10^5$ g.mols of butadiene for each g.atom of neodymium, or discontinuously into a polymerization reactor under agitation, or continuously in two reactors in series the first of which is homogeneous or to one end of an elongated reactor in which takes place the polymerization of the mixture which runs by piston ("plug-flow"), operating initially in all cases at a T<30° C. (first stage) and subsequently at a T=or >30° C. (second stage), the temperature being controlled by partial evaporation of the butadiene monomer from the liquid phase of polymerization at constant pressure until a mixture with a polymer content of approximately 25 to approximately 70% by weight is obtained.
the 1,4-cis polybutadiene is separated and recovered from this mixture discharged from the reactor.

The vehicle utilized for the catalyst according to this invention can be composed of inert (non reacting) hydrocarbons, with a low or relatively low boiling point, alicyclic, cyclic or ramified, such as butane, pentane, hexane, cyclohexane and heptane, or mixtures thereof. These hydrocarbons, introduced with the catalyst in small quantity even decidedly less than 5% by weight of the polymer produced, are separated from the polybutadiene upon completion of the two phases of polymerization.

According to another form of execution, the vehicle for the catalyst is composed of hydrocarbons, or hydrocarbon mixtures, of high molecular weight such as oil of paraffin and the like, or hydrocarbon oils required for formulations of oil-extended polybutadienes.

These hydrocarbons do not require separation and remain incorporated in the polybutadiene. It has been found in particular that when the content of oil of paraffin and the like is less than approximately 5% by weight of the polymer, the polymer's characteristics are not modified appreciably.

The neodymium compounds used in the preparation of the catalyst are chosen from among neodymium oxide ($Nd_2O_3$), neodymium alcoholates of aliphatic and cycloaliphatic alcohols, neodymium phenates and carboxylates of aliphatic, cycloaliphatic and aromatic organic acids. Of all the above, preference is given to neodymium oxide, neodymium tributylate, neodymium trinaphtenates and neodymium tri(2 ethyl-hexanoate).

It is also possible to utilize mixtures of neodymium with other rare earth elements, for example didymium, which is a mixture containing approximately 72% Nd, 10% La and 8% Pr, neodymium versatate or neodecanoate.

The organic compounds containing hydroxyl groups (alcoholic or phenolic) or carboxyl groups are chosen from among aliphatic and cycloaliphatic alcohols, phenols and substituted phenols, aliphatic, cycloaliphatic and aromatic acids.

Of all these preference is given to butyl alcohol, 2-ethylhexanoic acid, naphtenic acids and versatic acids. These compounds can be utilized in the free form, or partially or totally in the combined form with neodymium (neodymium alcoholates, phenates and carboxylates), as long as a ratio of the order of 2/1 to 80/1 between the hydroxyl groups (including those of the water) and the free and/or combined carboxyl groups and the neodymium atoms is respected.

It has been found that the addition of limited quantities of water, as a hydroxyl contributing compound, is desirable in that it improves the activity of the catalyst. More particularly, this effect of the water manifests itself when ratios in the range of 1/1 to 5/1 are maintained between the aluminum atoms of the organometallic aluminum compound or relative hydric compound and the mols of added water, the preferred values being approximately 2/1.

The halogen contributing compounds utilized in the preparation of the catalyst are preferably chosen from among hydrochloric acid, diethylaluminum chloride, ethylaluminum dichloride, aluminum trichloride, terbutylchloride, benzyl chloride and benzoyl chloride. In particular, hydrochloric acid can be introduced in the form of aqueous hydrochloric acid in order to furnish the desired quantity of water.

The organometallic compounds of aluminum and relative hydric derivatives are the aluminum trialkyls and the hydrides of aluminum alkyl. Preference is given to triethylaluminum, triisobutylaluminum and diisobutylaluminum monohydride.

The quantities of the various components of the catalyst are metered so as to maintain a ratio of gram atoms of aluminum/neodymium of 20/1 to 80/1 and a ratio of gram atoms of halogen/neodymium of 0.2/1 to 3/1.

In the preferred embodiment the values of the above mentioned ratios are of the order 3/1–30/1 for the hydroxyl groups (including those of the water) and/or carboxyl/neodymium atoms, of the order of 25/1–50/1 for the aluminum atoms/neodymium atoms, and of the order of 1/1–2/1 for the halogen atoms/neodymium atoms.

According to the process of this invention the catalytic mixture is prepared by placing the above indicated catalytic components in contact in the hydrocarbon vehicle, operating at ambient or above ambient temperatures.

The order and the method of addition of the catalytic components are not particularly critical; however, according to one form of execution, they are placed in contact in the hydrocarbon vehicle in the order indicated and at ambient temperature or lower (20°–25° C.);
neodymium alcoholate, phenate and/or carboxylate;
organometallic aluminum compound and/or relative hydric derivative;
halogenated compound;
hydroxyl and/or carboxyl compound and/or water.

According to another form of execution they are placed in contact in the hydrocarbon vehicle in the order indicated and at a temperature of 50°–80° C.:
neodymium oxide;
hydroxyl and/or carboxyl organic compound;
halogenated compound;
water.

The mixture is then cooled to ambient temperature or lower (20°–25° C.) and the following is added:
organometallic aluminum compound or relative hydric derivative.

Operating as indicated above a catalytic solution, or else a catalytic mixture in which the catalyst is mostly dissolved in the relative hydrocarbon vehicle, is obtained.

The catalytic mixture thus prepared is mixed with liquid butadiene monomer, in such quantity as to respect a ratio of $10^4$ to $4.10^5$ between g.mols of butadiene and the g.atoms of neodymium. Mixing can be carried out in any apparatus ensuring good homogeneization, for example a vessel under agitation acting as a batch polymerization reactor or first reactor in a continous process. Mixing is done at a suitably chosen temperature, but below 30° C. In the case of batch polymerization this temperature is subsequently increased (T=or>30° C.) for the second step of the reaction, with resulting separation in a solid polymeric phase and a liquid monomeric phase. The heat of reaction is dissipated by evaporation and recycling of the butadiene and constant pressure.

According to another form of execution in continuous, a stream of the catalytic mixture and a stream of liquid butadiene are introduced independently in a first polymerization reactor, adhering to the ratios indicated above.

While maintaining a temperature below 30° C. in the first step, 5 to 20% of the butadiene is polymerized, obtaining a viscous liquid which is introduced at the end of an elongated polymerization reactor operating above 30° C. and in which the reaction mass can flow by piston, or substantially by piston.

For example, the extruders in which the polymerization mass is driven by self-cleaning single or double screw agitators are suitable for the purpose.

The polymerization in this second step is generally carried out between an inlet temperature=or>30° C. and an outlet temperature not greater than 130° C. and preferably between an inlet temperature of the order of 50°–60° C. and an outlet value included between this last value and 80°–100° C.

In both polymerization steps, temperature control is achieved by partially evaporating the butadiene monomer at constant pressure; after condensation, it can be recycled to the reaction with no need for purification. The pressures at which polymerization is carried out are those which ensure the presence of butadiene monomer in liquid phase. For the temperature interval indicated above, these pressure values are suitably chosen as follows: less than 3.5 bars for the first step, and from 3.5 bars to 18 bars absolute for the next.

Operating within the range of general conditions outlined above, a mixture is discharged from the reactor having a polymer content of approximately 25 to approximately 70% by weight, with residence times of 10 to 120 minutes.

In the preferred operating conditions the overall residence times for the two steps are of the order of 20–60 minutes. For reasons of economy, it is convenient to operate with relatively high rates of conversion of butadiene to the relative polymer, discharging from the reactor mixtures with a polymer content of 60–70% by weight.

According to an embodiment of this invention, the mixture coming from the polymerization reactor is sent to a mixing apparatus in which are fed the polymerization stopping agents ("short-stopper") and the stabilizers against thermo-oxidative degradation of the polymer, preferably in the form of solution in butadiene. To deactivate the catalyst it is preferable to use water or organic acids such as resin acids, or higher aliphatic alcohols (containing for example 8 to 18 carbon atoms in the molecule), or their combinations after subsequent treatments, in quantities such as to exceed overall the sum of the catalytic components by at least 5–10 times in mols.

To the "short-stopper" other than acids are preferably added basifying agents soluble in it, such as ammonia, amines, epoxides and organic salts (alcoholates and carboxylates) of alkaline metals.

In addition to the usual antioxidant compounds used to preserve the polymer, such as sterically inhibited phenols and phosphites, radical capturing agents such as secondary amines and epoxides are preferably added to the hydrocarbon solution. The two solutions can conveniently be emulsified between them.

The mass thus treated can be sent to an adjacent heated screw apparatus (solvent removing extruder), in which the volatile substances are removed by evaporation, operating at temperatures in the range of 100° to 180° C. and atmospheric or near atmospheric pressure. This treatment serves to remove the unconverted butadiene, the eventual low boiling solvent introduced with the catalytic mixture, as well as the water introduced in excess of that required for the destruction of the catalytic system. The butadiene and eventual low boiling solvent are subjected to the usual treatments for their separation and recycling.

Operating according to the process of this invention, a polybutadiene in dry and stabilized form is typically obtained, with a content of volatile substances below approximately 1% by weight.

This polybutadiene furthermore has a 1,4-cis content generally above 97% and a Mooney viscosity (ML 1+4, 100° C.) of 30 to above 80.

By the process of this invention, it is therefore possible to obtain a linear polybutadiene free of gel and with a very high content of 1,4-cis units. This polymer requires no washing treatment for the separation of the catalytic residues.

Moreover, the process of this invention is simple and convenient, requires low power consumption and presents no problems of ecological nature in view of the elimination of the discharges.

The process described can also be utilized advantageously for the copolymerization of butadiene with other related diolefins such as, for example, isoprene, piperilene, obtaining copolymers with an essentially 1,4-cis structure.

The following experimental examples are given by way of illustrations and do not constitute limits to this invention.

EXAMPLE 1

Preparation of the catalytic solution

A 12×55 mm teflon coated metal plate is introduced in a heavy-walled glass bottle with a capacity of approximately 100 ml, after which the following are introduced in order:

| | |
|---|---|
| naphtenic acids (acidity number = 200) | 19.8 g |
| $Nd_2O_3$ (95%) | 4.04 g |
| t.Butylchloride | 4.25 ml |
| oil of paraffin | 45.0 ml |

The bottle is stoppered with a neoprene sealed perforated crown stopper and transferred to a water bath thermostatically controlled at 80° C. By means of a revolving magnet, the metal plate is set in whirling agitation. After 5 minutes, 0.08 ml of HCl in 37% aqueous solution (C. Erba) is added to the reaction mixture by means of a micro syringe inserted through the rubber seal. After about 80 minutes the color of the suspension turns from grayish to nut-brown. The reaction is pursued for a total of three hours at 80° C. The resulting dense solution, titered after it has been allowed to rest for three hours at ambient temperature, exhibits an Nd content of 0.343 mol/l.

Over approximately 5 minutes it is transferred slowly to a glass flask which already contains 820 ml of 0.97 molar solution of $(i.C_4H_9)_2AlH$ in paraffin oil under mechanical agitation, introduced beforehand in the flask in dry $N_2$ atmosphere.

The solution thus obtained is held for 24 hours at ambient temperature before use. Elementary analysis reveals the following molarities.

| | |
|---|---|
| Nd | 0.027 g/atoms/l |
| Al | 0.892 g/atoms/l |
| Cl | 0.040 g/atoms/l |

Polymerization - Reference Test

The polymerization reactor consists of a steel cylinder arranged horizontally, with a capacity of approximately 2.8 l, equipped with a mechanical agitator capable of mixing high viscosity masses. In the upper part of the reactor there is a device conveying the vapors produced by the reaction to an external condenser and metering pump.

The reactor is also equipped with a heating jacket with built-in electrical resistance.

The charging of reagents is done by placing the reactor under vacuum (0.1 torr) and connecting it to a bottle containing butadiene, from which 1000 g are transferred. After thermostating at 60° C., 19.4 ml (equal to 0.52 mmols of Nd) of the above described catalytic solution are introduced in an autoclave.

The pressure of 6.7 atm, reached by thermostating and obtained in the entire butadiene recycling installation, is maintained constant (together with the temperature of the reaction mass) throughout the test, since the vapors developed are continuously conveyed in a 4×6 mm coil immersed in a bath at −78° C., collected in a cylindrical tank with level indicator and returned to the reactor.

The temperature of the liquid inside the tank is approximately minus 15° C. thanks to an immersed coil in which a refrigerating mixture circulates.

The dispersion of reactor heat to the atmosphere is partially compensated by the heating jacket, whose temperature is held at approximately 2° C. above that of the reaction mass. The speed of the agitator is 40 rpm.

The reaction is terminated 38 minutes after the addition of the catalyst by introduction of 0.5 l of distilled and deaerated $H_2O$. The unreacted butadiene is removed by depressurizing and applying a vacuum in the autoclave at 60° C.

The polymer is removed from the various locations inside the reactor (shaft, walls, etc.: 7 in all) and the various aliquots are dried and characterized separately.

The Mooney viscosity values (1+4, 100°: ML) are as follows:

| ML max | (highest value found) | 82 |
|---|---|---|
| ML min | (lowest value found) | 64 |
| $\overline{ML}$ | (value for the entire polymer) | 76.3 |

The conversion with respect to the initial butadiene amounts to 48%.

EXAMPLE 2

A polymerization of the butadiene is carried out in the same equipment and with the same reagents as used for the test of Example 1, with the difference that the initial thermostating temperature is 20° C. instead of 60° C.

The reaction, initiated with the addition of the catalyst, is pursued for 10 minutes at 20° C. by the methods already described (recycling of condensed vapors, etc.: see Example 1). Then the vapor conveying valve at the head of the reactor is closed and the temperature of the jacket is set at 62° C. Within 10 more minutes, approximately, the internal temperature reached 60° C. and at this point the external circuit of the vapors produced by the reaction is restored.

The polymerization is interrupted with $H_2O$ (see Example 1) 33 minutes after the beginning by the evidently greater effort of the agitator, whose absorbed power is more than tripled, as indicated by the reading of an ammeter.

The polymer produced, sampled as already described, exhibits the following Mooney viscosities:

| ML max = | 35.5 |
|---|---|
| ML min = | 34 |
| $\overline{ML}$ = | 35 |

Global conversation amounts to 56.7%

EXAMPLE 3

Operating according to the methods of Example 2, with the equipment and reagents therein described, the butadiene is polymerized as before, with the difference that in the second step the temperature is set at 50° C. instead of 60° C. Also, the first step at 20° C. is continued for 17 minutes.

The duration of the test is 58 minutes from the introduction of the catalyst. The polymer produced yields the following values:

| ML max = | 25 |
|---|---|
| ML min = | 24 |
| $\overline{ML}$ = | 24.5 |

The butadiene conversion is 40.2%.

EXAMPLE 4

A polymerization test such as described in Examples 2 and 3 is carried out, the only difference being that the temperature of the second phase is 70° C.

The reaction is interrupted after 40½ minutes from the beginning and the dry polymer is characterized in the usual manner.

The results indicate the following values:

| ML max = | 40.5 |
|---|---|
| ML min = | 39 |
| $\overline{ML}$ = | 39.5 |

Conversion 61%.

We claim:

1. In a process for the preparation of 1,4-cis polybutadiene or butadiene copolymers with other related diolefins for the catalytic polymerization or copolymerization of butadiene monomer, in the absence or substantial absence of solvents or diluents, comprising preparing a catalytic mixture by placing in contact in an inert hydrocarbon vehicle the following:
   (a) at least one neodymium compound chosen from among neodymium oxide, alcoholates, phenates and carboxylates or mixtures thereof with other rare earth elements;
   (b) at least one organic compound containing hydroxyl groups derived from alcohols or phenols or carboxyl groups, with the possible addition of water;
   (c) at least one halogen compound, chosen from among secondary or tertiary alcohol halogenides, aryl or alkylaryl halogenides, halogenides or organic acids, metallic or organometallic halogenides, and halogens; and
   (d) at least one organometallic aluminum compound or relative hydride derivatives thereof; wherein the quantities of compounds (a) and (b) are such so as to obtain a ratio between hydroxyl groups (including those of water) and/or carboxyl groups and neodymium atoms of 2/1 to 80 and maintaining contact of said components to thereby obtain a catalytic mixture having an aluminum/neodymium ratio of 20/1 to 80/1 and a halogen/neodymium ratio of 0.2/1 to 3/1; feeding said catalytic mixture and liquid butadiene monomer, possibly premixed, in quantities of $10^4$ to $4 \cdot 10^5$ g.mols of butadiene per g.atom, discontinuously in an agitated polymerization reactor, or continuously in two reactors in series the first of which is homogeneous, or at one end of an elongated reactor in which is carried out the polymerization of the mixture flowing by piston ("plug-flow"), controlling the temperature through the partial evaporation of butadiene monomer from the liquid phase of polymerization, until a mixture with a polymer content of approximately 25 to approximately 70% by weight is obtained, which is discharged from the other end of the reactor; and separating and recovering 1,4-cis polybutadiene from said mixture discharged from the reactor; the improvement comprising carrying out polymerization in two phases, the first phase is carried out at a temperature of between 0° and 30° C. and the second phase is carried out at a temperature of between 50° and 90° C.

2. Process according to claim 1 characterized by the fact that the first phase is interrupted when a 5-20% butadiene conversion is reached.

3. Process according to claim 1 characterized by the fact that the hydrocarbon vehicle for the catalyst is chosen from among butane, pentane, hexane, cyclohexane and heptane, or their mixtures, oil of paraffin or hydrocarbon oils suitable for formulations of oil-extended polybutadienes.

4. Process according to claim 1, characterized by the fact that the rare earth element is didymium and the neodymium or didymium compounds are chosen from among neodymium oxide ($Nd_2O^3$), neodymium tributylate, neodymium-trinaphtenate tri(2-ethylhexaneote) and the corresponding didymium compounds.

5. Process according to claim 1, characterized by the fact that the organic compounds containing hydroxyl and carboxyl groups are chosen from among butyl alcohol, 2-ethylhexylic acid and naphthenic acids.

6. Process according to claim 1, characterized by the fact that the halogenated compounds are chosen from among hydrochloric acid, diethylaluminum chloride, terbutylchloride, benzyl chloride and benzoyl chloride.

7. Process according to claim 1 characterized by the fact that the organometallic aluminum compounds and relative hydrohydride derivatives are chosen from among trialkyl aluminum and alkyl aluminum hydrides.

8. Process according to claim 6 characterized by the fact that said aluminum compounds are chosen from among triethylaluminum, triisobutylaluminum and diisobutylaluminum monohydrate.

9. Process according to claim 1 characterized by the fact that water is added to the catalyst in such quantity that the ratio of aluminum atoms of the organometallic aluminum compound or relative hydrohydride derivative to the mols of added water is 1/1 to 5/1.

10. Process according to claim 9 characterized by the fact that the ratio of aluminum atoms of the organometallic aluminum compound or relative hydrohydride derivative to the mols of added water is of the order of 2/1.

11. Process according to claim 1 characterized by the fact that in the catalyst the ratio of hydroxyl groups (including those in the water) and/or carboxyl groups/neodymium atoms is of the order of 3/1-30/1, the ratio of aluminum atoms/neodymium atoms is of the order of 25/1-50/1 and the ratio of halogen atoms/neodymium atoms is of the order of 1/1-2/1.

12. Process according to claim 1 characterized by the fact that polymerization is carried out in the first step at a pressure of less than 3.5 bars and in the second step at a pressure of 3.5 to 18 bars absolute.

13. Process according to claim 1 characterized by the fact that the total residence time in both polymerization steps varies between 10 and 120 minutes.

14. Process according to claim 13, characterized by the fact that said residence time is of the order of 20-60 minutes.

15. Process according to claim 1 characterized by the fact that polymerization is carried out continuously using for the first step a homogeneous reactor under agitation and for the second step an extruder type apparatus with self-cleaning single or double screw.

16. Process according to claim 1 characterized by the fact that polymerization is carried out discontinuously in a reactor under agitation operating in two successive steps at two different operating pressures.

17. Process according to claim 1 characterized by the fact that the butadiene monomer vaporized during polymerization is condensed and recycled directly to the polymerization.

18. Process according to claim 1 characterized by the fact that to the outgoing mixture of continuous polymerization are added polymerization stopping agents and stabilizers against thermo-oxidative degradation, in a mixing apparatus placed in series with the polymerization reactor.

19. Process according to claim 18 characterized by the fact that the polymerization stopping agents are chosen from among water, organic acids and $C_8$–$C_{18}$ aliphatic alcohols.

20. Process according to claim 19 characterized by the fact that to the water and alcohols are added basifying agents chosen from among ammonia, amines, epoxides and organic salts (alcoholates and carboxyls) of alkaline metals.

21. Process according to claim 20 characterized by the fact that with the polymerization stopping agents are associated antioxidant compounds and radical capturing agents such as secondary amines and epoxides.

22. Process according to claim 18, 19, 20 or 21 characterized by the fact that said polymerization stopping agents and said antiradicals are introduced in the form of emulsion in the presence of liquid butadiene.

23. Process according to claim 1 characterized by the fact that the additive reaction mixture is deprived of low boiling substances, operation at temperatures of 100° to 180° C., at atmospheric pressure, in a heated screw apparatus placed in series with the mixing apparatus of claim 20.

* * * * *